US006986587B2

(12) United States Patent
Kaneko

(10) Patent No.: US 6,986,587 B2
(45) Date of Patent: Jan. 17, 2006

(54) VARIABLE-SHAPE REFLECTION MIRROR AND METHOD OF MANUFACTURING THE SAME

(75) Inventor: Shinji Kaneko, Kokubunji (JP)

(73) Assignee: Olympus Corporation, Tokyo (JP)

( * ) Notice: Subject to any disclaimer, the term of this patent is extended or adjusted under 35 U.S.C. 154(b) by 42 days.

(21) Appl. No.: 10/685,674

(22) Filed: Oct. 15, 2003

(65) Prior Publication Data

US 2004/0201908 A1 Oct. 14, 2004

(30) Foreign Application Priority Data

Oct. 16, 2002 (JP) ............................. 2002-301995

(51) Int. Cl.
*G02B 7/188* (2006.01)

(52) U.S. Cl. ...................... 359/847; 359/846; 359/291; 359/295

(58) Field of Classification Search ................ 359/847, 359/846, 291, 295, 290; G02B 7/188
See application file for complete search history.

(56) References Cited

U.S. PATENT DOCUMENTS 4,093,351 A * 6/1978 Perkins et al. .............. 359/847
5,561,523 A * 10/1996 Blomberg et al. .......... 356/454
6,424,450 B1 * 7/2002 Goossen ...................... 359/290
6,464,364 B2 * 10/2002 Graves et al. .............. 359/846
6,525,880 B2 * 2/2003 Flanders et al. ............ 359/578
6,568,647 B2 * 5/2003 Graves et al. .............. 248/476
6,581,465 B1 * 6/2003 Waters et al. ............ 73/514.26
6,665,109 B2 * 12/2003 Little et al. ................. 359/290
2002/0118464 A1 * 8/2002 Nishioka et al. ............ 359/642

FOREIGN PATENT DOCUMENTS

JP 2-101402 4/1990
JP 8-334708 12/1996

OTHER PUBLICATIONS

Gleb Vdovin, et al., "Technology and applications oof micromachined silicon adaptive mirrors", Optical Engineering vol. 36, No. 5, pp. 1382-1390, May 1997.*
Grosso, R. P., et al., "The membrane mirror as an adaptive optical element", J. Opt. Soc. Am., vol. 67, No. 3, pp. 399-406, Mar. 1977.
Koumura, T., et al., "Aberration Reduction of SI Diaphragm Focusing Mirror", the paper of the Japan Society for Precision Engineering, vol. 61, No. 5, pp. 697-701, 1995.

* cited by examiner

*Primary Examiner*—John Juba, Jr.
(74) *Attorney, Agent, or Firm*—Scully, Scott, Murphy & Presser

(57) ABSTRACT

A variable-shape mirror comprises a flexible film having a plurality of electrodes and a reflective surface whose shape varies when electrostatic forces are applied to the electrodes. The electrodes are divided in a circumferential direction and in a radial direction of the flexible film. The flexible film having a greater number of circumferential-directional divisions in a peripheral portion thereof then in a central portion thereof.

6 Claims, 11 Drawing Sheets

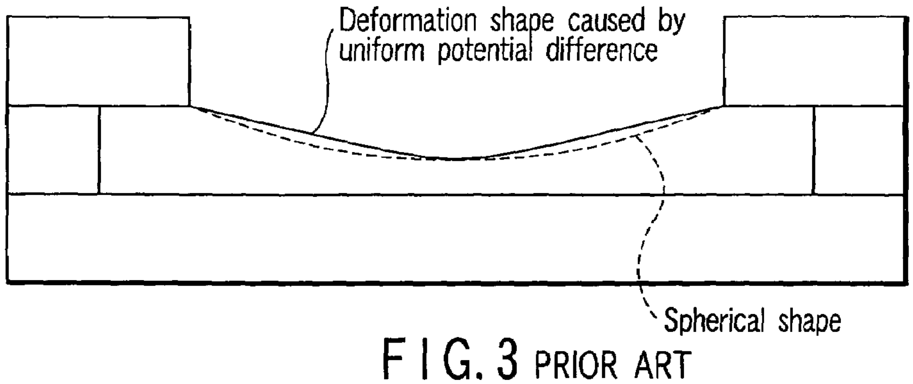
FIG. 3 PRIOR ART
FIG. 4
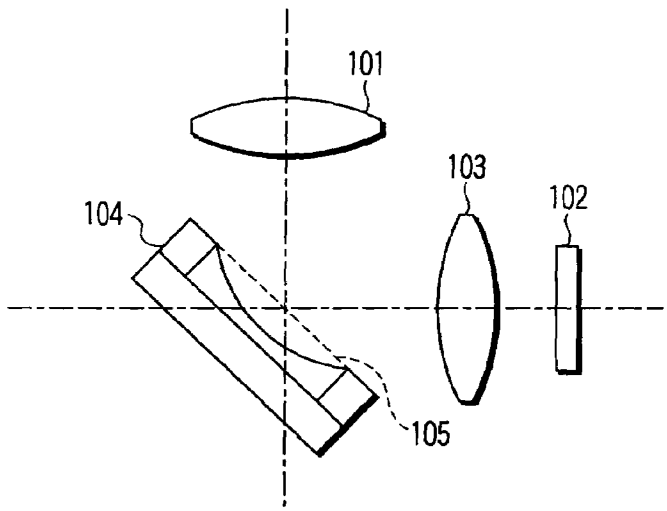
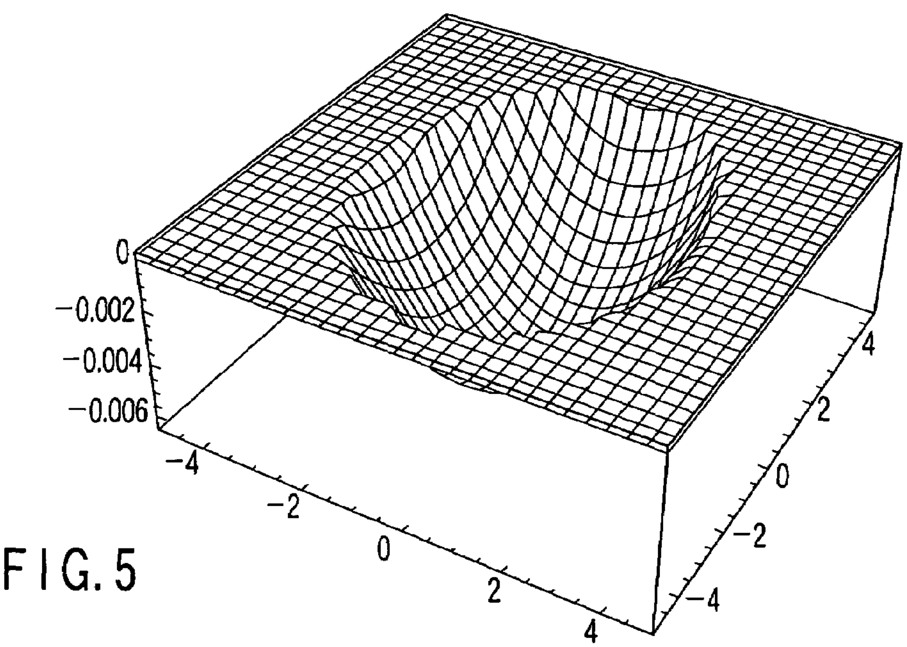
FIG. 5

VARIABLE-SHAPE REFLECTION MIRROR AND METHOD OF MANUFACTURING THE SAME

CROSS-REFERENCE TO RELATED APPLICATIONS

This application is based upon and claims the benefit of priority from the prior Japanese Patent Application No. 2002-301995, filed Oct. 16, 2002, the entire contents of which are incorporated herein by reference.

BACKGROUND OF THE INVENTION

1. Field of the Invention

The present invention relates to a variable-shape reflection mirror, in particular, a small-sized variable-shape reflection mirror capable of high-precision shape control, and to a method of manufacturing the variable-shape reflection mirror using semiconductor fabrication technology.

2. Description of the Related Art

In the field of micro-optical systems applied to microoptics, such as optical pickups, a very small variable-focus mirror capable of varying the curvature of its reflective surface has been proposed for the purpose of simplifying a mechanism relating to focusing, etc., which conventionally uses an electromagnetic actuator. The application of such a variable-focus mirror contributes greatly to further miniaturization of small-sized imaging optical systems.

As regards this type of variable-focus mirror, high-precision products can be manufactured at low cost by applying so-called micro-electromechanical system (MEMS) technology. An example of this technology is proposed in Jpn. Pat. Appln. KOKAI Publication No. 2-101402, for instance. The technique of this document is described below.

As is shown in FIG. 1A and FIG. 1B, a fixed-side electrode layer 12 formed of an electrically conductive film is provided on an upper surface of an insulating substrate 11 formed of, e.g. glass. A silicon dioxide ($SiO_2$) film 14 is formed as an insulating film on one major surface of a silicon substrate 13. A recess 15 is formed on a central portion of the other major surface of the silicon substrate 13. The recess 15 enables a central portion of the $SiO_2$ film 14 to be displaced in its thickness direction. In addition, a movable-side electrode layer 16 is laminated on the $SiO_2$ film 14. Central portions of the $SiO_2$ film 14 and the electrode layer 16 constitute a mirror portion 17. With a voltage applied between the electrode layers 12 and 16, the mirror portion 17 is deformed in a convex shape toward the fixed-side electrode layer 12.

The silicon substrate 13 is coupled to the insulating substrate 11 via a spacer 18, with the $SiO_2$ film 14 being situated downward (in FIGS. 1A and 1B). Further, an $SiO_2$ film 19 is formed on the other major surface of the silicon substrate 13.

A method of manufacturing the above-described mirror device will now be explained with reference to FIGS. 2A to 2E. To start with, as shown in FIG. 2A, $SiO_2$ films 14 and 19 each having a thickness of 400 nm to 500 nm are formed on both mirror-polished surfaces of a silicon substrate 13, which has a plane direction <100>. A metal film with a thickness of about 100 nm is formed as an electrode layer 16 on the lower-side film 14. Then, as shown in FIG. 2B, a photoresist 20 with a predetermined pattern is coated, and a circular window 21 is formed by photolithography. Using the photoresist 20 as a mask, an opening is formed in the $SiO_2$ film 14 with a hydrofluoric-acid-based solution, with the lower-side surface of the substrate being protected. Subsequently, as shown in FIG. 2C, the silicon substrate 13 is immersed in an aqueous solution of ethylenediamine Pyrocatechol and the silicon substrate 13 is etched from the window 21 shown in FIG. 2B. The etching stops when the $SiO_2$ film 14 on the lower side of the substrate 13 is exposed. As a result, a film mirror portion 17 formed of the $SiO_2$ film 14 and electrode layer 16 remains.

On the other hand, as shown in FIG. 2D, a metal film with a thickness of 100 nm, which serves as a fixed electrode, is formed as an electrode layer 12 on the upper surface of the insulating substrate 11 having a thickness of 300 $\mu$m. As is shown in FIG. 2E, the silicon substrate 13 is bonded to the insulating substrate 11 with a polyethylene spacer portion 18 with a thickness of about 100 $\mu$m interposed, whereby the mirror device shown in FIGS. 1A and 1B is manufactured.

In the above-described variable-shape mirror, a uniform potential difference is provided between the $SiO_2$ film 14 and the fixed-side electrode layer 12. The deformation shape in this case is generally as shown in FIG. 3, compared to a spherical surface having an equal maximum deformation amount. In particular, the amount of deformation in a peripheral portion is deficient and a large spherical aberration occurs. Consequently, high focusing performance cannot be attained. Moreover, when a small-sized mirror is applied to an imaging optical system, oblique light incidence occurs in usual cases. In such cases, in order to obtain good focusing performance, a rotation-asymmetric aspherical surface is required.

To meet this requirement and to deform the variable-shape mirror in a desired shape or an ideal shape, there is an idea of the fixed-side electrode layer being divided into a plurality of regions and different potential differences provided between the divided regions, on the one hand, and the electrode of the deformable surface, on the other hand. Examples of the division mode of the electrode include a concentric shape, a lattice shape and a honeycomb shape. For instance, J. Opt. Soc. Am., Vol. 67, No. 3, March 1977, "The membrane mirror as an adaptive optical element", proposes a method of dividing the fixed-side electrode in a honeycomb shape.

In addition, the paper of the Japan Society for Precision Engineering, Vol. 61, No. 5, 1995, entitled "Aberration reduction of Si diaphragm dynamic focusing mirror", discloses a method for making the shape of deformation conform to a specific shape such as a spherical surface shape or a parabolic surface shape. In this method, a deformable surface having a different thickness from location to location is formed.

BRIEF SUMMARY OF THE INVENTION

According to a first aspect of the present invention, there is provided a variable-shape mirror comprising a flexible film having a plurality of electrodes and a reflective surface whose shape varies when electrostatic forces are applied to the plurality of electrodes, the plurality of electrodes being divided in a circumferential direction and in a radial direction of the flexible film, and the flexible film having a greater number of circumferential-directional divisions in a peripheral portion thereof than in a central portion thereof.

According to a second aspect of the present invention, there is provided a variable-shape mirror comprising a flexible film having a plurality of electrodes and a reflective surface whose shape varies when an electrostatic force is applied to the plurality of electrodes, the flexible film having, in a peripheral region, a portion having a rigidity lower than a rigidity of remaining region of the flexible film.

According to a third aspect of the present invention, there is provided a variable-shape mirror comprising a flexible film having a plurality of electrodes and a reflective surface whose shape varies when an electrostatic force is applied to the plurality of electrodes, the flexible film including a portion with a low rigidity in a circumferential direction thereof, and a ratio of the portion with the low rigidity varies in the circumferential direction of the flexible film.

According to a fourth aspect of the present invention, there is provided a variable-shape mirror comprising a flexible film having a plurality of electrodes and a reflective surface whose shape varies when an electrostatic force is applied to the plurality of electrodes, the flexible film including openings in a circumferential direction thereof, and a ratio of the openings varies in the circumferential direction of the flexible film.

According to a fifth aspect of the present invention, there is provided a variable-shape mirror comprising:

a plurality of fixed lower electrodes; and a flexible film having a reflective surface and a plurality of upper electrodes, the lower electrode has, in a region thereof, a plurality of openings arranged at different intervals, and the flexible film has, in a peripheral portion thereof, a portion having a rigidity lower than a rigidity of other regions of the flexible film.

According to a sixth aspect of the present invention, there is provided a method of manufacturing a variable-shape mirror, comprising:

forming first and second protection films on first and second major surfaces of a semiconductor substrate;

forming a flexible film on the first protection film;

forming a plurality of openings in the flexible film;

forming an electrode film on the flexible film;

forming an opening in the second major surface and the second protection film, and forming a frame by a residual portion of the semiconductor substrate.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view for explaining a deformation amount of the variable-shape mirror when a uniform potential difference is provided;

FIG. 4 schematically shows the structure of an optical system to which a variable-shape mirror according to a first embodiment of the present invention is applied;

FIG. 5 is a three-dimensional view of the deformation shape of the reflective surface in the first embodiment;

DETAILED DESCRIPTION OF THE INVENTION

Figure 1A:
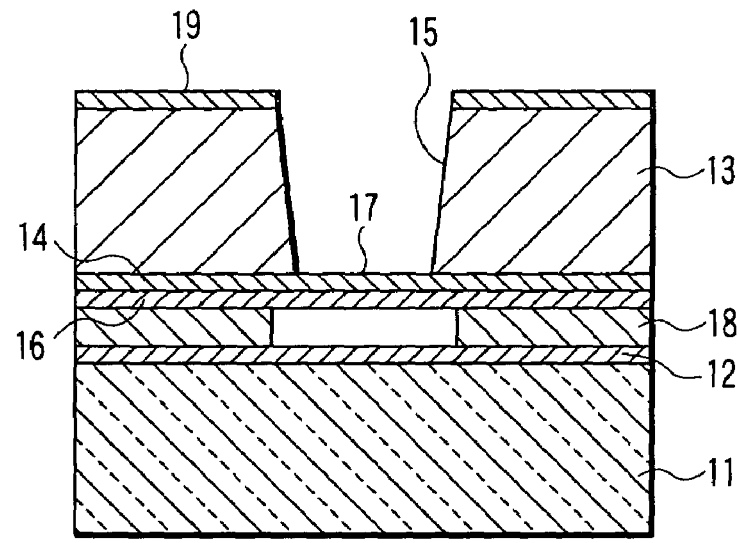
FIG. 1A and FIG. 1B show the structure of a prior-art variable-shape mirror.
Figure 1B:
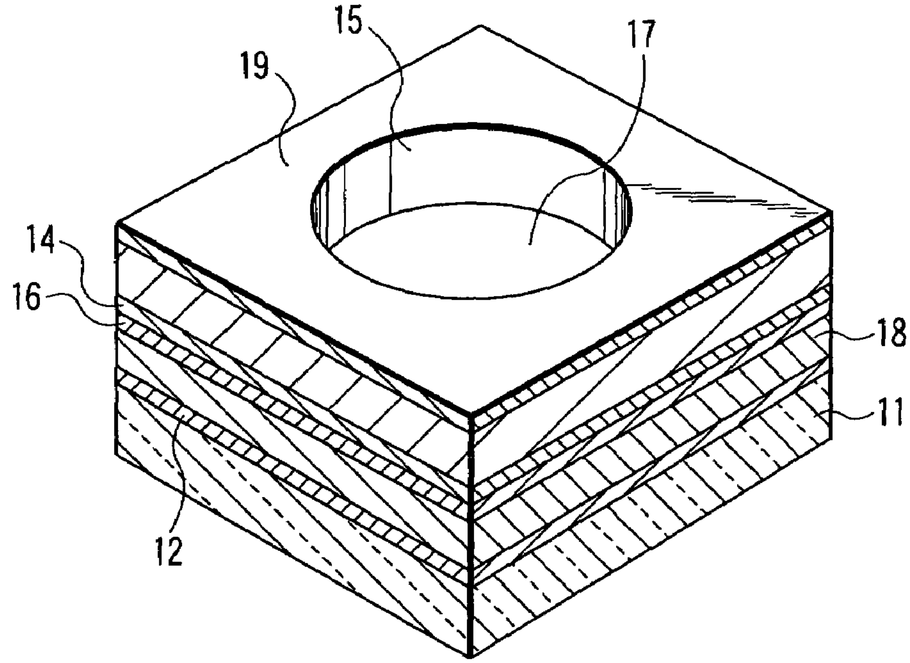
Figure 2A:
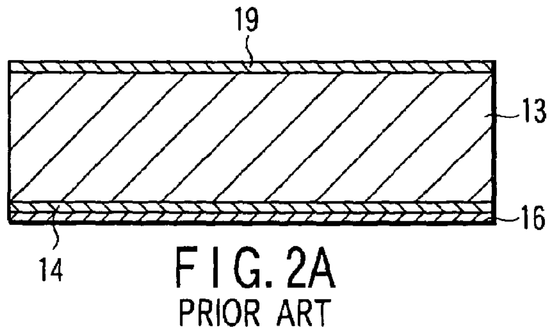
FIGS. 2A to 2E illustrate a method of manufacturing the prior-art variable-shape mirror.
Figure 2D:
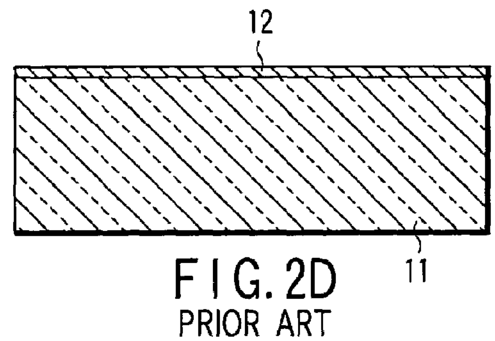
Figure 2B:
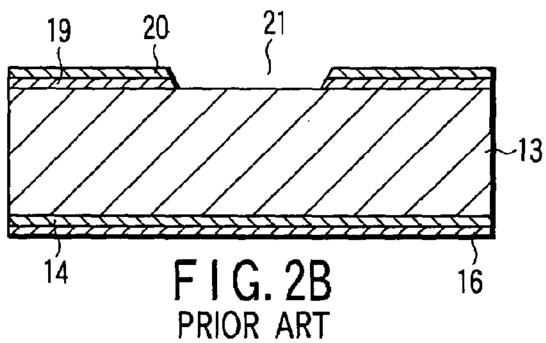
Figure 2E:
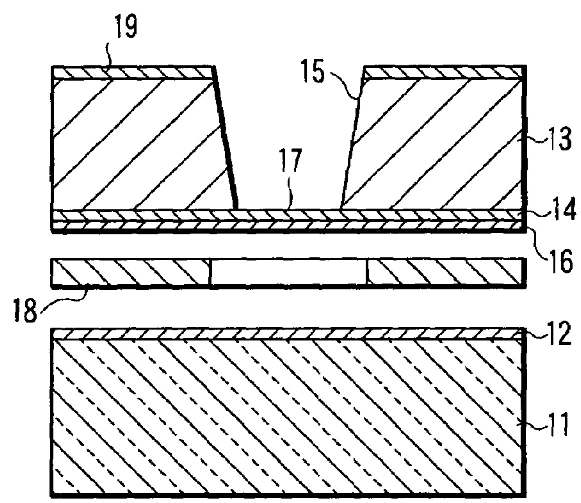
Figure 2C:
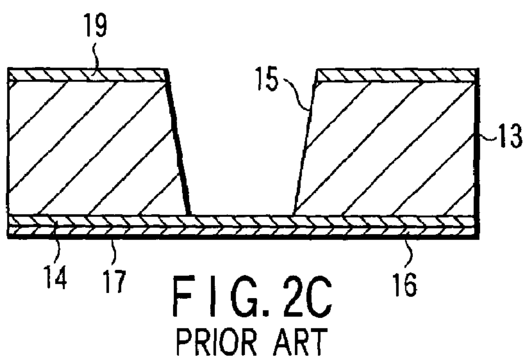

Embodiments of the present invention will now be described with reference to the accompanying drawings.

[First Embodiment]

A first embodiment of the present invention is described. FIG. 4 schematically shows the structure of an optical system to which a variable-shape mirror according to the first embodiment of the invention is applied.

An incidence-side front lens group 101 and a rear lens group 103, which is located on the side of a solid-state imaging device 102, are arranged such that their optical axes intersect at right angles. At the intersection, a variable-shape mirror 104 is disposed. By an electrostatic force, a deformable film 105 with the reflective surface of the variable-shape mirror 104 deforms continuously from a flat shape (indicated by a broken line in FIG. 4) to a concave shape (indicated by a solid line in FIG. 4). Thereby, the focal point of the optical system is varied. In short, by virtue of the deformation of the variable-shape mirror 104, focus adjustment can be made without adjusting the lens groups.

When the reflective surface has a flat shape, focusing is made at infinity. When the reflective surface has a concave shape, focusing is made at a near-point. However, since a light beam falls obliquely on the concave-surface mirror, a large spherical aberration occurs when the deformed surface is simple spherical surface or a parabolic surface. In such a case, high-precision imaging cannot be performed, and so it is necessary to deform the reflective surface into a rotation-asymmetric free-form surface.

Figure 6:
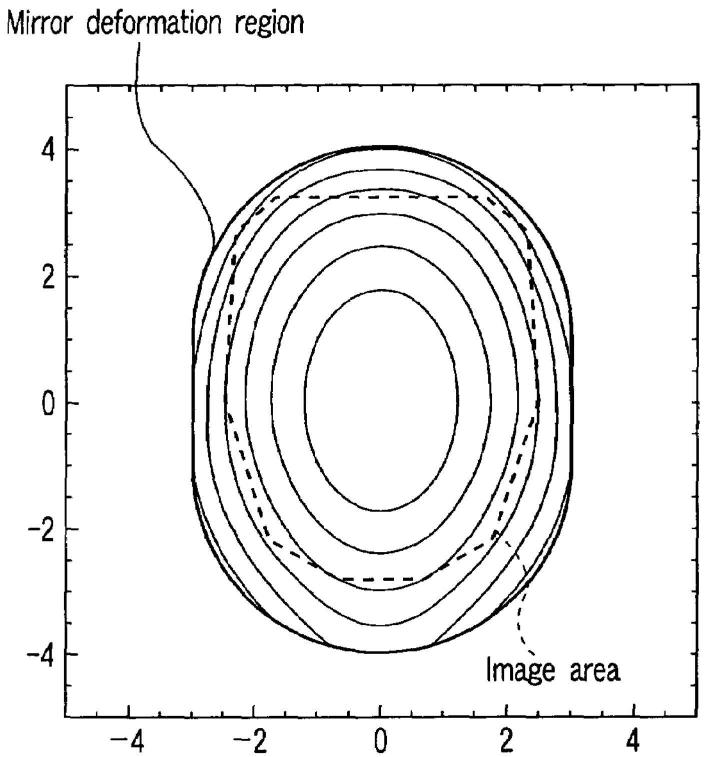
FIG. 6 is a contour diagram representing a displacement of the reflective surface.

FIGS. 5 and 6 show an example of the shape of the reflective surface designed so as to suppress a near-point spherical aberration in relation to the actual lens construction. FIG. 5 is a three-dimensional view of the deformation shape of the reflective surface. The size of the deformation region of the reflective surface is set such that a rectangle of 6 mm×2 mm is interposed between a pair of semicircles each having a radius of 3 mm. FIG. 6 is a contour diagram representing a displacement of the reflective surface. FIG. 6 also shows an image area corresponding to effective pixels of the solid-state imaging device 102 in a case where the variable-shape mirror with this reflective surface is applied to the optical system shown in FIG. 4.

Figure 7:
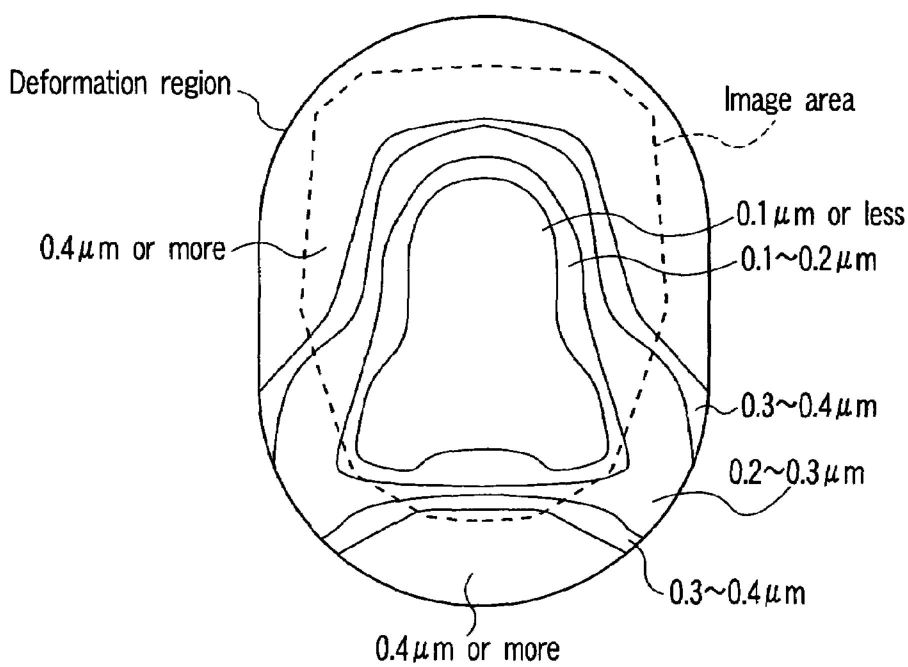
FIG. 7 is a distribution map of an error between a deformation shape and an ideal shape in a case where a uniform electrostatic force is applied to the deformation surface of the variable-shape mirror.

FIG. 7 shows a distribution of an error between the deformation shape obtained when a uniform electrostatic force is applied to the deformation surface of the variable-shape mirror and the ideal shape based on the optical design shown in FIG. 5 or FIG. 6. In fact, only the error within the image area indicated in FIG. 7 is the problem. The error is particularly large in an outer peripheral region of the deformation surface. Further, as is understood, in the outer peripheral region of the deformation surface, the error in the circumferential direction is non-uniform, and the degree of the error varies greatly. As a matter of course, the error distribution varies due to the design of optical system. However, the error distribution has a generally similar tendency when an ordinary rotation-symmetric lens and this variable-shape mirror are combined.

In order to perform high-precision imaging, it is imperative to make the deformation shape of the reflective surface close to the ideal shape. To meet this requirement, it is necessary to divide one of the mutually opposed electrodes and to impart a distribution to the electrostatic force applied to the deformation surface of the variable-shape mirror.

Figure 8:
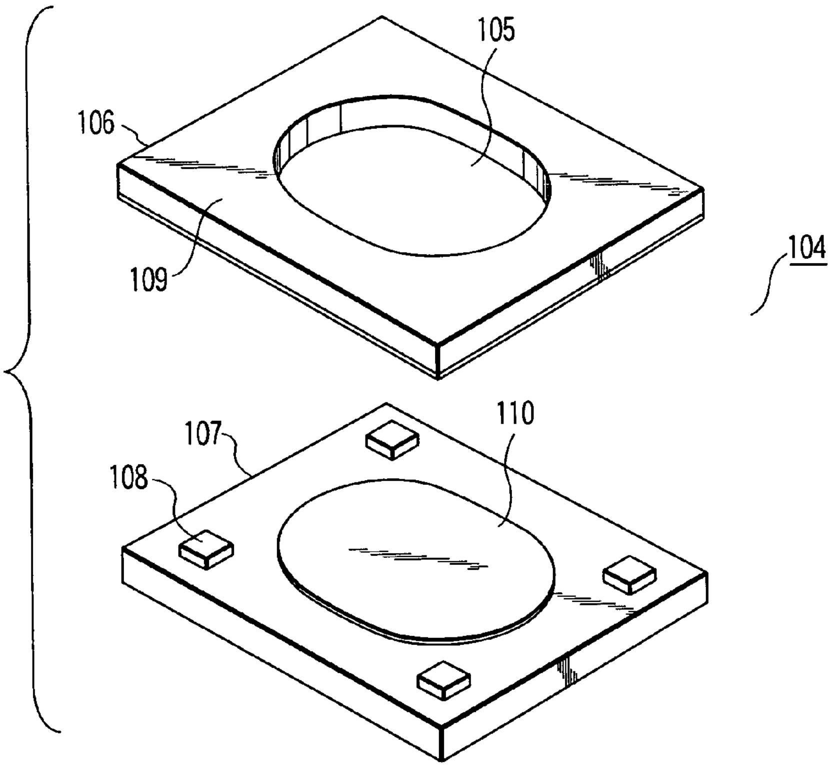
FIG. 8 shows the structure of the variable-shape mirror according to the first embodiment of the invention.

The structure of the variable-shape mirror 104 according to the first embodiment will now be described with reference to FIG. 8. The variable-shape mirror 104 according to the first embodiment is configured such that an upper substrate 106 and a lower substrate 107 are coupled to each other, with spacers 108 formed on the lower substrate 107 being interposed therebetween. In FIG. 8, for the purpose of description, the upper substrate 106 and lower substrate 107 are separated. The upper substrate 106 has a deformation film 105 supported on a frame member 109. A fixed electrode 110, which is divided into a plurality of regions, is formed on that region of the lower electrode 107 which is opposed to the deformation film 105. Although not shown in FIG. 8, the aforementioned reflective surface is formed on the deformation film 105. The deformation film 105 has electrical conductivity. The regions of the deformation film 105 and fixed electrode 110 are electrically connected to an external controller, and potentials can independently be applied to these regions. In order to prevent flare, it is desirable to paint the light-incidence side of the frame member 109 black, or to attach a black plate with an opening to the image area of the deformation film 105.

Figure 9:
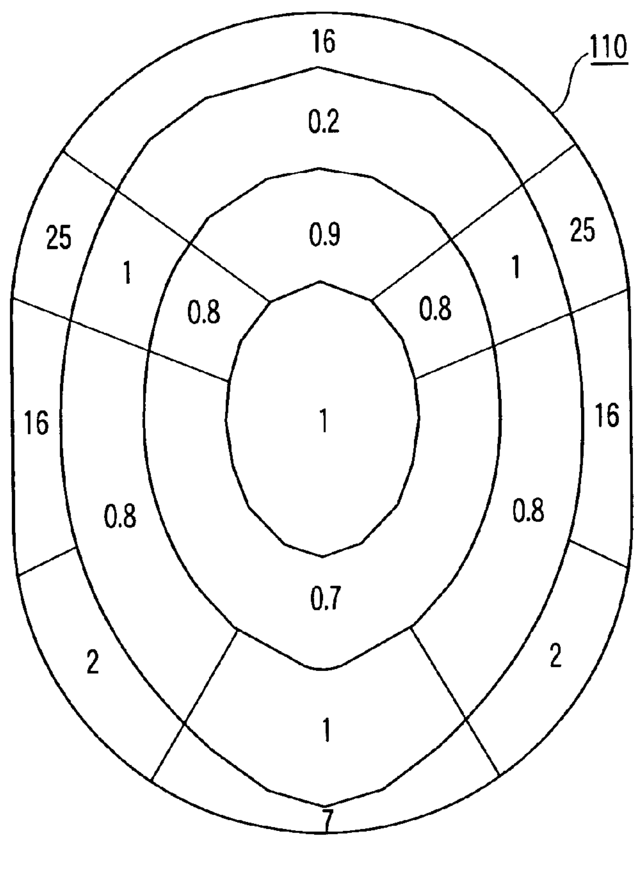
FIG. 9 shows the shape of the fixed electrode, and electrostatic forces applied to a central region (expressed by "1") and to other regions.

FIG. 9 shows the shape of the fixed electrode 110, which is so divided as to conform to the shape shown in FIG. 5 or FIG. 6, and electrostatic forces applied to a central region (expressed by "1") and to other regions of the fixed electrode 110. If the electrostatic forces are applied in this manner, the error in shape can be limited to 100 nm or less over almost the entire region of the image area.

As is understood from FIG. 9, the number of division lines in the circumferential direction of the fixed electrode 110 is greater in the peripheral portion than in the central portion of the deformation region. This indicates that an error in the circumferential direction is greater in the outer peripheral portion than in the central portion of the deformation region, and electrostatic forces, whose intensity levels are defined in finer degrees, need to be applied to the peripheral portion. Division lines in the radial direction substantially correspond to the contour lines shown in FIG. 6.

As is understood from FIG. 6 showing that a plurality of contour lines cross the outer periphery of the image area or the outer periphery of the deformation region, the height of the outer periphery of the deformation region is non-uniform in optical design. However, in the case of the variable-shape mirror, it is necessary, from the structural aspect thereof, to equalize the height of the outer periphery of the deformation region. To meet the requirement, the gradient in the radial direction is, in general, greater in the circumferential direction in the region between the outer periphery of the deformation region and the outer periphery of the image area.

In this way, the region of the electrode, which is located on the outer periphery of the deformation region, where the amount of error in the circumferential direction becomes relatively large, is divided into finer portions than the region of the electrode. Thereby, an error from the ideal shape can be reduced with a fewer number of divisions, compared to the method of simply dividing the electrode in a rectangular shape or a honeycomb shape.

[Second Embodiment]

A second embodiment of the present invention will now be described. In the first embodiment, as shown in FIG. 9, a considerably great electrostatic force needs to be applied to the outer peripheral region, compared to the central region. In other words, it is necessary to apply a particularly high voltage to the outer peripheral region, resulting in an increase in drive voltage. A cause of this is that the deformation film is completely fixed at the outer peripheral portion of the deformation region and a strong force is required to bend the deformation film to a large degree.

This problem can be solved by increasing the distance between the image area and the outer periphery of the deformation region. However, this would undesirably lead to an increase in size of the variable-shape mirror itself. The second embodiment aims at realizing a small-sized, high-shape-precision variable-shape mirror without the need to increase the drive voltage.

Figure 10:
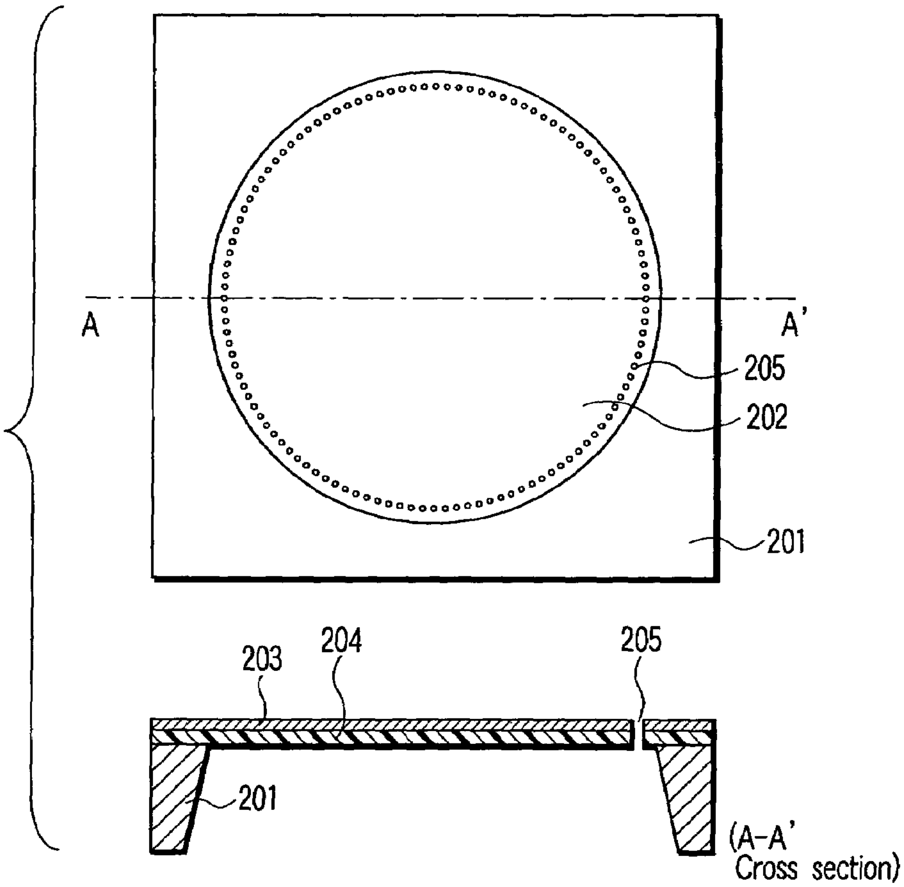
FIG. 10 shows the shape of an upper substrate of a variable-shape mirror according to a second embodiment of the present invention.

FIG. 10 shows the shape of an upper substrate of the variable-shape mirror according to the second embodiment. A circular deformation film 202 with a diameter of 7.5 mm, which is supported on a frame member 201, has a two-layer structure. The two-layer structure comprises an aluminum film 203 with a thickness of 50 nm, which serves as a reflective film and an electrode film, and a polyimide film 204 with a thickness of 1 μm. Openings 205 are formed at regular intervals in an outer peripheral portion of the deformation film 202.

The upper substrate is formed by semiconductor fabrication technology, and the openings 205 can easily be made by using ordinary photolithography technology. By forming the openings 205 in the outer peripheral portion in a discrete fashion, the flexural rigidity of the deformation film in this region is remarkably lowered. As a result, even without applying a strong electrostatic force to the outer peripheral portion of the deformation film 202, the outer peripheral portion can be deformed in a predetermined shape.

For the purpose of easier understanding, FIG. 10 shows relatively large openings. If the size of each opening is large, however, a warp may possibly occur in the reflective surface due to non-uniformity of rigidity. In fact, therefore, it is desirable to form minimum possible openings at short intervals.

In the second embodiment, each opening 205 is a complete through-hole. This is because it is important to discretely form regions with low flexural rigidity. Alternatively, openings 205 may be formed only in one of the aluminum film 203 or polyimide film 204.

Figure 11:
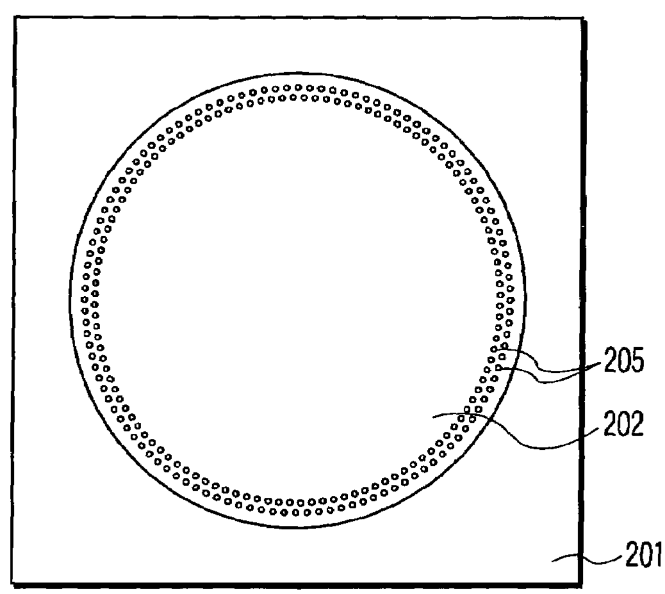
FIG. 11 illustrates a modification of the second embodiment.

In the second embodiment, a single row of openings is formed in the circumferential direction. Alternatively, two rows of openings 205 may be formed, as shown in FIG. 11. If a plurality of rows of openings are formed, the flexural rigidity in the region with the openings can remarkably be decreased.

[Third Embodiment]

Figure 12:
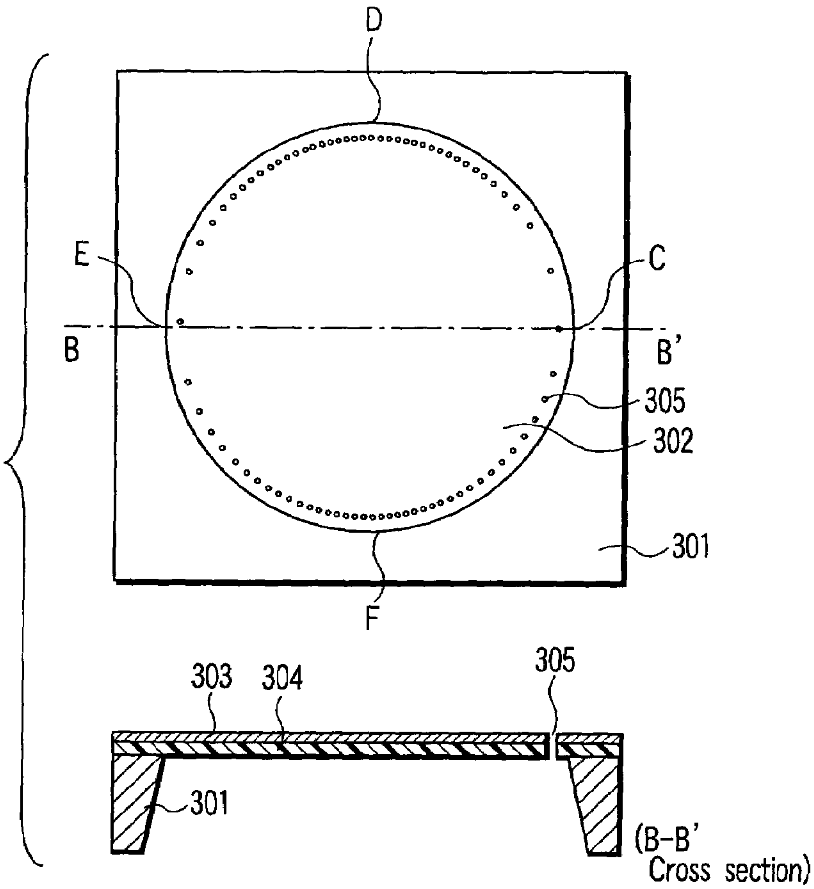
FIG. 12 shows the shape of an upper substrate of a variable-shape mirror according to a third embodiment of the present invention.

A third embodiment of the present invention will now be described. FIG. 12 shows the shape of an upper substrate of a variable-shape mirror according to the third embodiment. A deformation film 302, which is supported on a frame member 301, has a two-layer structure. The two-layer structure comprises an aluminum film 303 with a thickness of 50 nm, which serves as a reflective film and an electrode film, and a polyimide film 304 with a thickness of 1 μm. Circular openings 305 are formed at irregular intervals in an outer peripheral portion of the deformation film 302. In general, the variable-shape mirror applied to the configuration shown in FIG. 4 is required to have a rotation-asymmetric deformation shape, and thus the displacement gradient of an outer peripheral portion of the deformation film toward a central portion of the deformation film varies from location to location.

Figure 13:
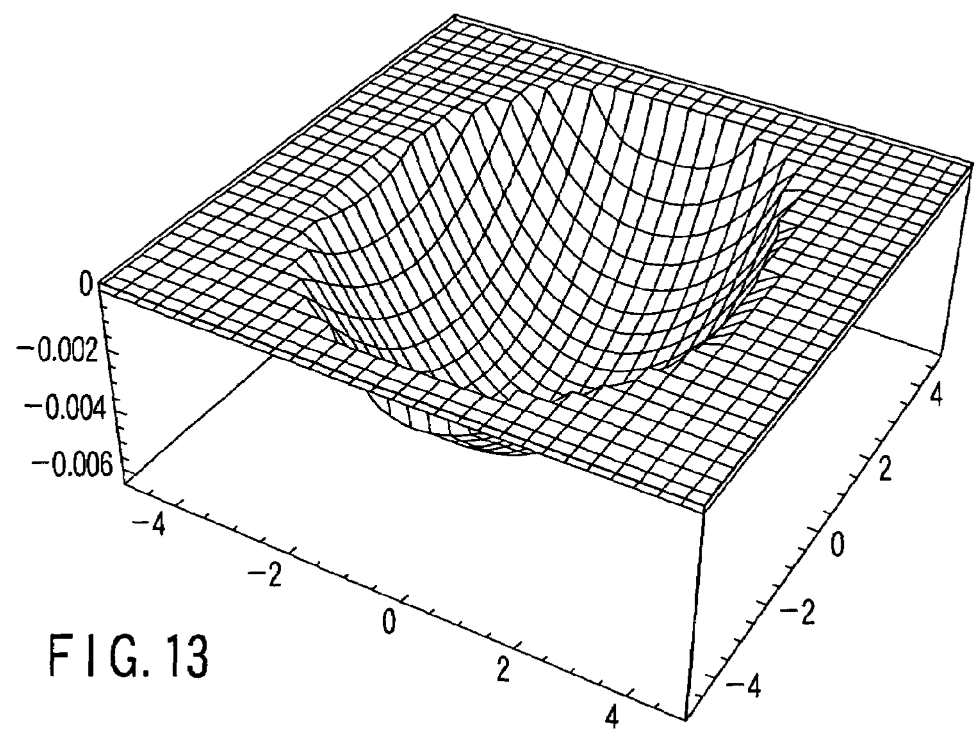
FIG. 13 is a three-dimensional view of the deformation shape of the reflective surface in the third embodiment.
Figure 14:
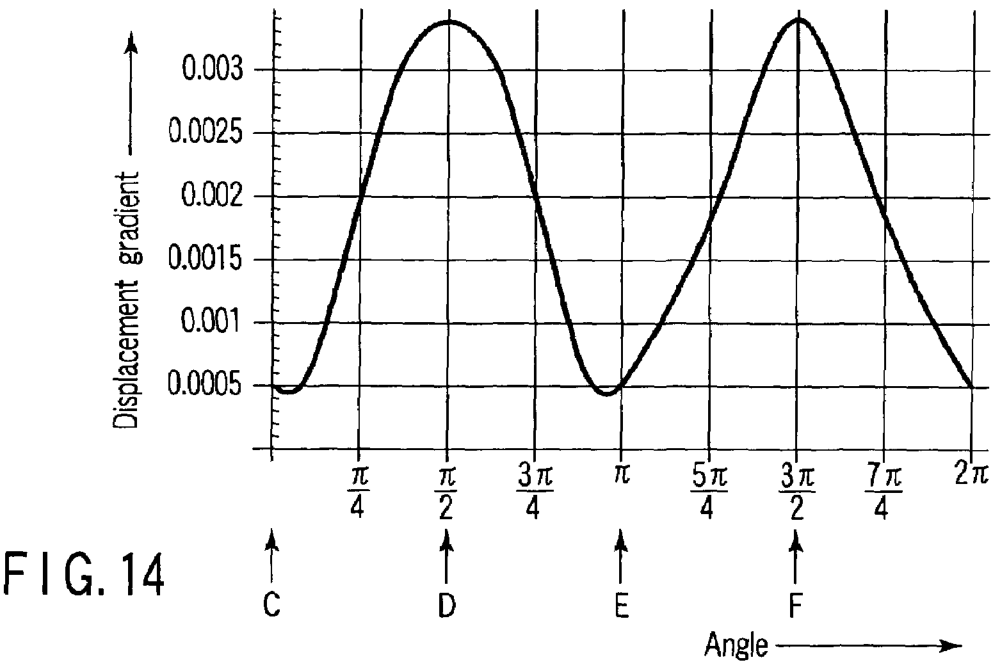
FIG. 14 is a distribution map showing an average displacement gradient toward the central region in the third embodiment.

FIG. 13 is a three-dimensional view of the deformation shape based on optical design in the third embodiment. The deformation region of the variable-shape mirror is circular with a diameter of 7.5 mm, as shown in FIG. 12. FIG. 14 shows an average displacement gradient toward the central portion of the deformation region, which is plotted in the anticlockwise direction about the center of the deformation region, beginning from a location C indicated in FIG. 12. As is understood from FIG. 14, the displacement gradient is small in portions C and E in FIG. 12, and the displacement gradient is large in portions D and F. When an electrostatic force is applied to the deformation film 302, it is desirable, therefore, to increase the flexural rigidity of the portions C and E and to decrease the flexural rigidity of the portions D and F. The flexural rigidity of the outer peripheral portion varies depending on the interval of openings 305. Hence, the flexural rigidity can be decreased by decreasing the intervals. On the other hand, the flexural rigidity can be increased by increasing the intervals or by not forming the opening 305.

In short, if the intervals of openings 305 are adjusted according to the displacement gradient of each location on the outer peripheral portion, the deformation shape of the deformation film 302 can be made close to that shown in FIG. 13 without the need to greatly change the electrostatic force applied to the deformation film 302 from location to location on the deformation film 302.

In the third embodiment, the size or shape of all openings 305 is made equal and the intervals of openings 305 are varied from location to location. Needless to say, the same advantages can be obtained by changing the size or shape of each opening 305 while setting equal intervals. Moreover, as in the case shown in FIG. 11, a difference in flexural rigidity among respective locations can be increased by forming two rows of openings 305.

[Fourth Embodiment]

Figure 15:
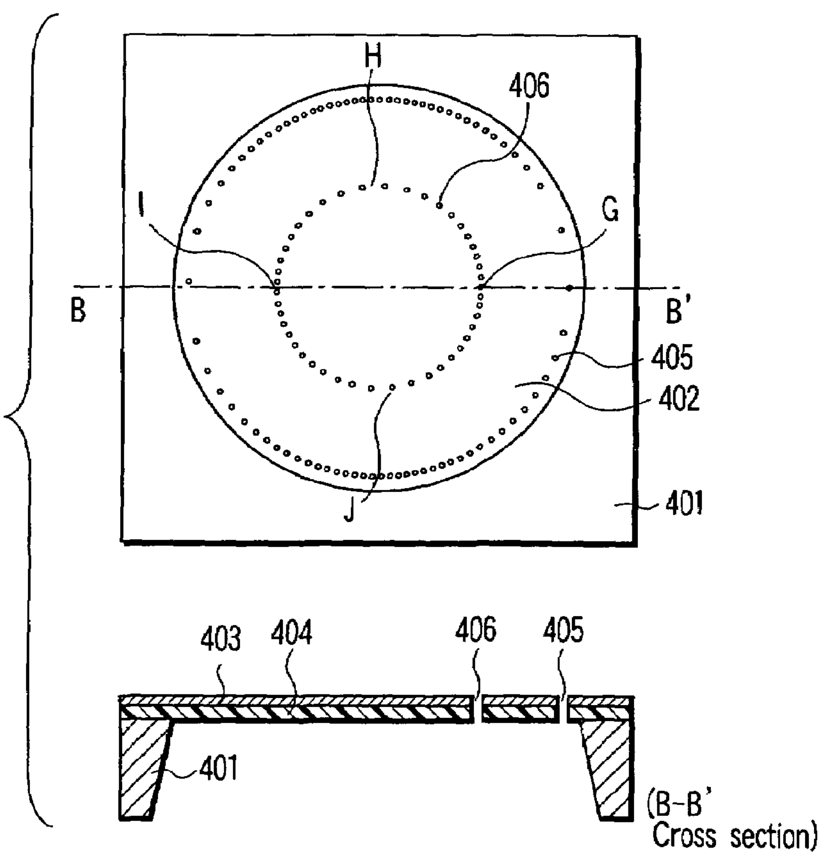
FIG. 15 shows the shape of an upper substrate of a variable-shape mirror according to a fourth embodiment of the present invention.

A fourth embodiment of the present invention will now be described. FIG. 15 shows the shape of an upper substrate of a variable-shape mirror according to the fourth embodiment. A deformation film 402, which is supported on a frame member 401, has a two-layer structure. The two-layer structure comprises an aluminum film 403 with a thickness of 50 nm, which serves as a reflective film and an electrode film, and a polyimide film 404 with a thickness of 1 μm. Circular openings 405 are formed at irregular intervals in an outer peripheral portion of the deformation film 402. In addition, circular openings 406 are formed at irregular intervals along a circumferentially extending portion of the deformation film 402, which is located at a radial distance of 2 mm from the center of the deformation film 402. A deformation shape of the deformation film 402, which is to be obtained, is the same as that shown in FIG. 13, and the deformation region is also the same as shown in FIG. 13. Assume that the openings 405 are arranged with the same shape and intervals as the openings 305 shown in FIG. 12.

Figure 16:
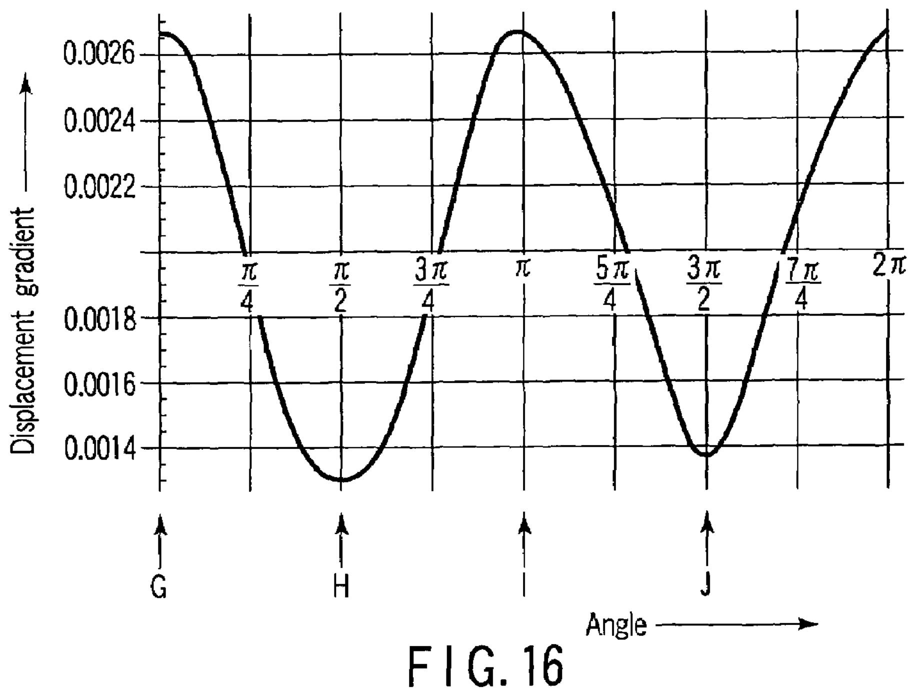
FIG. 16 is a distribution map showing an average displacement gradient toward the central region in the fourth embodiment.

FIG. 16 shows an average displacement gradient toward the central portion of the deformation region, which is plotted in the anticlockwise direction along the circumferentially extending portion at a radial distance of 2 mm from the center of the deformation film 402, beginning from a location G indicated in FIG. 15. As is understood from FIG. 16, the displacement gradient is large in portions G and I in FIG. 15, and the displacement gradient is small in portions H and J. When an electrostatic force is applied to the deformation film 402, it is desirable, therefore, to decrease the flexural rigidity of the portions G and I and to increase the flexural rigidity of the portions H and J. The flexural rigidity of the circumferentially extending portion passing through locations GHIJ varies depending on the interval of openings 406. Hence, the flexural rigidity can be decreased by decreasing the intervals. On the other hand, the flexural rigidity can be increased by increasing the intervals or by not forming the opening 406.

In short, if the intervals of openings 406 are adjusted according to the displacement gradient of each location on the outer peripheral portion, the deformation shape of the deformation film 402 can be made close to that shown in FIG. 13 without the need to greatly change the electrostatic force applied to the deformation film 402 from location to location on the deformation film 402.

In the fourth embodiment, the size or shape of all openings 406 is made equal and the intervals of openings 406 are varied from location to location. Needless to say, the same advantages can be obtained by changing the size or shape of each opening 406 while setting equal intervals.

Moreover, like the case shown in FIG. 11, a difference in flexural rigidity among respective locations can be increased by forming two rows of openings 406. In the fourth embodiment, for the purpose of simple description, the openings 406 are arranged only along the circumferentially extending portion GHIJ on the deformation film 402. Needless to say, openings 406 may be arranged over the entire area of the deformation film 402 with a density corresponding to the displacement gradient.

In addition, even if the openings 406 are formed on the circumferentially extending portion GHIJ or over the entire area of the deformation film 402 at a uniform density, the rigidity of the deformation film 402 can advantageously be decreased and this contributes to a decrease in drive voltage. Unlike the second and third embodiments, in the fourth embodiment wherein the openings 406 are formed in the image area, the focusing performance of the optical system is inevitably degraded to some degree. Thus, the number of openings 406 is determined based on a tolerable decrease in focusing performance. From two standpoints, i.e. diffraction and optical loss at end portions, it is desirable that the size of each opening 406 be as small as possible. In particular, it is desirable that the size of each opening 406 be set to have a diameter not greater than a wavelength of light.

In the fourth embodiment, openings 405 and 406 are provided along two circumferentially extending portions, one being located near the outer periphery and the other being located at a radial distance of 2 mm from the center. Alternatively, openings may be arranged on more than two circumferentially extending portions at a density corresponding to the displacement gradient along these circumferentially extending portions, or openings may be arranged over the entire area of the deformation film at a density corresponding to the displacement gradient of the deformation shape to be obtained. In the fourth embodiment, the deformation film 402 is circular. However, the embodiment is applicable even when the deformation film 402 has another shape such as an oval shape.

The second to fourth embodiments have been described, presupposing the configuration of the electrostatic drive type variable-shape mirror according to the first embodiment. However, these embodiments are applicable to an electromagnetic variable-shape mirror wherein a coil is formed on the deformation film and a magnet for producing a magnetic field crossing the coil at right angles is disposed. As is described in Jpn. Pat. Appln. KOKAI Publication No. 8-334708, for instance, in the case of a small-sized electromagnetic variable-shape mirror, it is difficult, from structural aspects, to apply different forces to respective locations on the deformation film. Thus, the method of providing a rigidity distribution to the deformation film, as shown in the second to fourth embodiments, is particularly effective in consideration of the shape control performance.

Figure 17A:
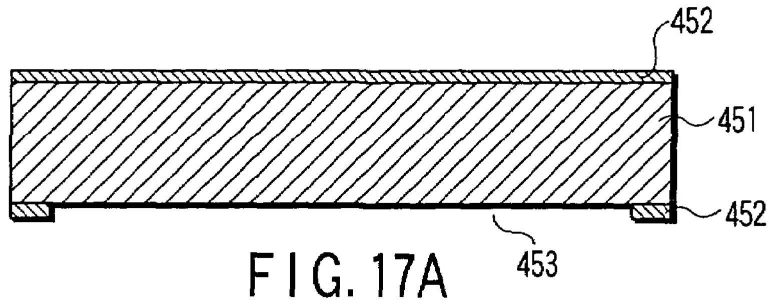
FIG. 17A to FIG. 17D illustrate a method of manufacturing the variable-shape mirror.
Figure 17B:
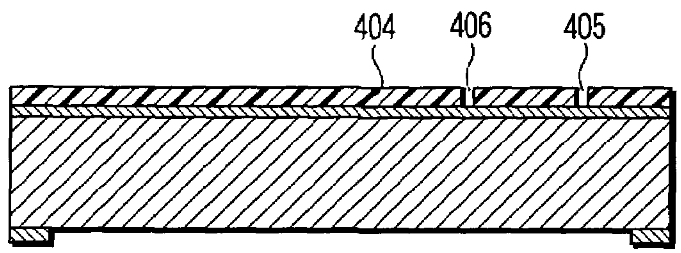
Figure 17C:
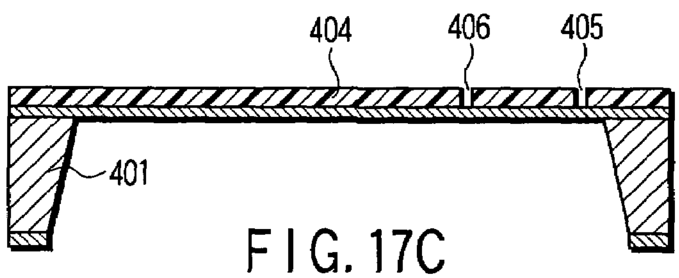
Figure 17D:
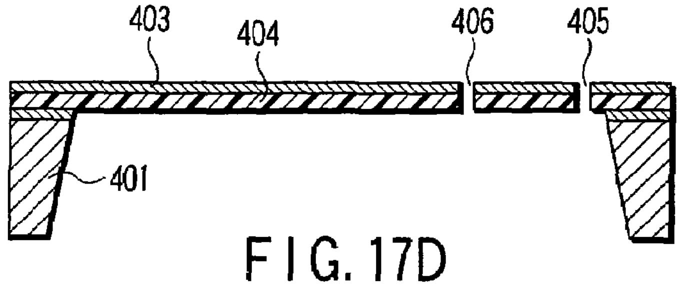

A method of fabricating the upper substrate of the variable-shape mirror according to the fourth embodiment will now be described referring to FIG. 17A through FIG. 17D. To begin with, as shown in FIG. 17A, silicon nitride films 452 are formed on both surfaces of a silicon substrate 451. An opening portion 453 is formed in the back-side silicon nitride film 452 by an ordinary photolithography technique. Then, as shown in FIG. 17B, a polyimide film 404 with a thickness of 1 $\mu$m is formed by on the upper-side silicon nitride film 452 by spin coat method. Openings 405 and 406 are formed at predetermined locations on the polyimide film 404 by photolithography. Subsequently, as shown in FIG. 17C, with the upper side being protected, the silicon substrate is etched from the back side through the opening portion 453 in the silicon nitride film 452 using an alkaline aqueous solution, until the upper-side silicon nitride film 452 is exposed. In this case, the residual portion of the silicon substrate 451 becomes the frame member 401 of the upper substrate. Next, as shown in FIG. 17D, the exposed upper-side silicon nitride film 452 is etched from the back side by reactive ion etching. Thereafter, an aluminum film 403 with a thickness of 50 nm is formed on the upper surface of the polyimide film 404 by means of sputtering or evaporation. At this time, the openings 405 and 406 become through-holes by setting the size of each opening 405, 406 to be sufficiently greater than the thickness of the aluminum film 403. The aluminum film 403 serves as a reflective surface and an electrode for applying electrostatic force.

As described above, a great number of fine through-holes can easily be formed with high precision by photolithography.

Figure 18A:
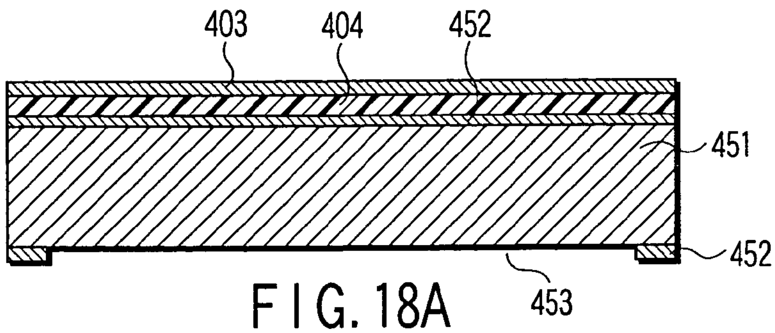
FIG. 18A to FIG. 18D illustrate another method of manufacturing the variable-shape mirror.
Figure 18B:
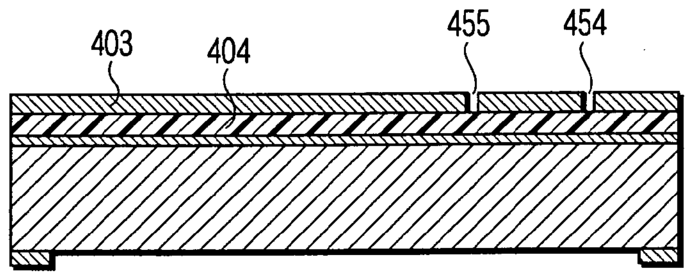
Figure 18C:
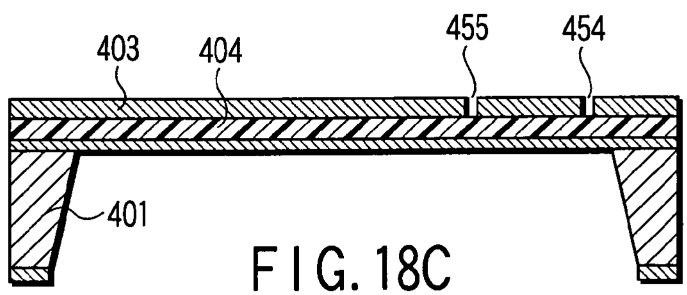
Figure 18D:
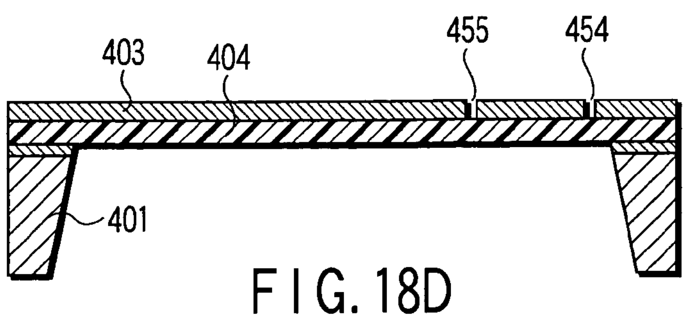

Another method of fabricating the upper substrate of the variable-shape mirror is described referring to FIGS. 18A to 18D. To begin with, as shown in FIG. 18A, silicon nitride films 452 are formed on both surfaces of a silicon substrate 451. An opening portion 453 is formed in the back-side silicon nitride film 452 by an ordinary photolithography technique. Then, as shown in FIG. 18A, a polyimide film 404 with a thickness of 1 $\mu$m and an aluminum film 403 with a thickness of 50 nm are formed on the upper-side silicon nitride film 452 by spin coat method. Subsequently, as shown in FIG. 18B, openings 454 and 455 are formed in the aluminum film 403 by ordinary photolithography. The positions of these openings correspond to those of the openings 405 and 406 in FIG. 17B. Thereafter, as shown in FIG. 18C, with the upper side being protected, the silicon substrate is etched from the back side through the opening portion 453 in the silicon nitride film 452 using an alkaline aqueous solution until the upper-side silicon nitride film 452 is exposed. Next, as shown in FIG. 18D, the exposed upper-side silicon nitride film 452 is etched from the back side by reactive ion etching.

In the upper substrate formed by this fabrication method, the openings 454 and 455 are not through-holes. However, since the rigidity of the deformation film in this region with the openings is decreased, the similar advantage to the case of the through-holes can be expected although there is a difference to some degree.

[Fifth Embodiment]

Figure 19:
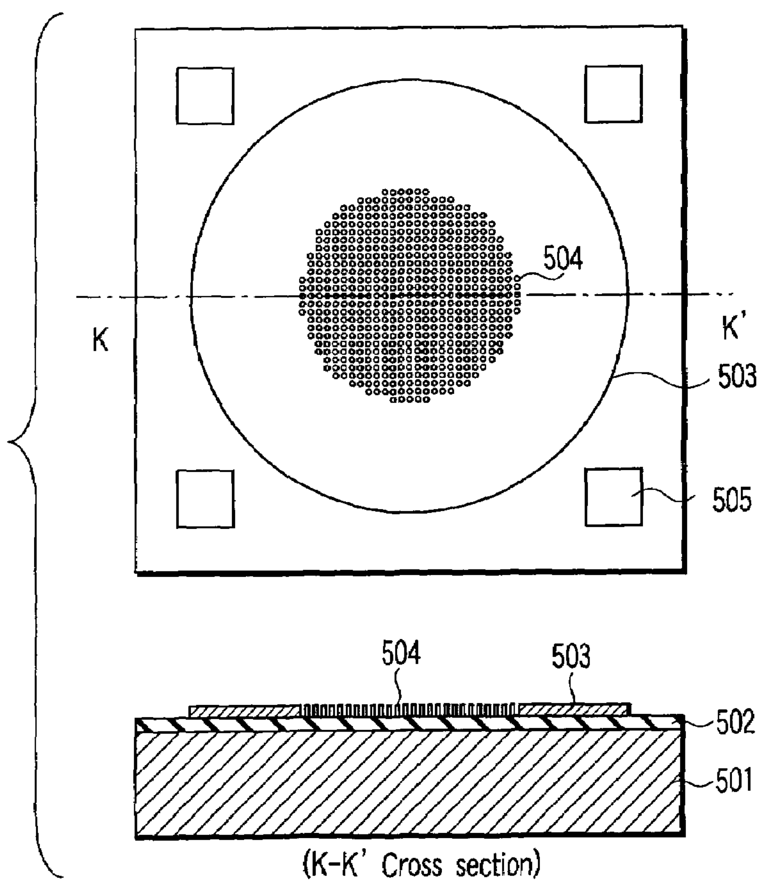
FIG. 19 shows the structure of a lower electrode of a variable-shape mirror according to a fifth embodiment of the present invention.

A fifth embodiment of the present invention will now be described. FIG. 19 shows the structure of the electrode on the lower substrate in the fifth embodiment. A lower electrode 503 is formed on a silicon substrate 501 via an insulating film 502. A great number of openings 504 are formed in a central region of the lower electrode 503. In addition, spacers 505 are formed on the outside of the lower electrode 503. The spacers 505 correspond to the spacers 108 in FIG. 8. Assume that the upper substrate to be bonded to the lower electrode has openings at irregular intervals in an outer peripheral portion of the deformation region thereof, as shown in FIG. 15. In operation of the variable-shape mirror of this embodiment, the deformation film and the silicon substrate 501 are grounded and a voltage is applied to the lower electrode 503.

In the case of the upper substrate described in connection with the third embodiment, the flexural rigidity is varied in accordance with the displacement gradient in the circumferential direction of the outer peripheral portion. Thereby, the deformation shape is made close to the optical design shape. In general, however, if a uniform potential difference is applied to the deformation region thereby to produce an electrostatic force, an error occurs between the actual shape and the ideal shape. Thus, as in the first embodiment, the lower electrode needs to be divided into some regions, although the number of divided regions may be less than in the case where no opening is formed in the deformation film.

In the fifth embodiment, however, openings are formed in a portion of the lower electrode. Thereby, a distribution is provided to the electrostatic force acting on the deformation film, and thus the deformation shape is controlled. If the technique of the fifth embodiment is compared to that of the fourth embodiment, a drive voltage becomes higher since there is no advantage of decreasing the rigidity of the deformation film itself excluding the outer peripheral portion. However, there is no degradation in the focusing performance due to diffraction at openings in the deformation film. Therefore, in the variable-shape mirror of the fifth embodiment, the deformation film can be deformed in a predetermined shape with a single drive voltage or a very small number of drive voltages. Hence, the control circuit can be simplified, contributing to a decrease in cost and size.

For the purpose of simple description, in the fifth embodiment, relatively large openings are arranged at uniform density in the central region. However, the density of openings is decreased in a region where a large electrostatic force needs to be applied to deform the deformation film into a predetermined shape. On the other hand, in a region where a small electrostatic force needs to be applied, it is desirable that the density of openings be increased and the size of each opening be reduced as much as possible.

In the fifth embodiment, in order to provide a predetermined distribution to the electrostatic force acting on the deformation film, the openings are arranged at different densities on regions of the lower electrode. It should suffice, however, if the ratio of the region of the lower electrode, which is opposed to the deformation film and is supplied with a potential different from a potential applied to the deformation film, varies from location to location.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A variable-shape mirror comprising a flexible film having a plurality of electrodes and a reflective surface whose shape varies when electrostatic forces are applied to the plurality of electrodes, the plurality of electrodes being divided in a circumferential direction and in a radial direction of the flexible film, and the flexible film having a greater number of circumferential-directional divisions in a peripheral portion thereof than in a central portion thereof.

2. A variable-shape mirror comprising a flexible film layer, the mirror having a plurality of electrodes in a layer on at least one surface thereof and a reflective surface whose shape varies when an electrostatic force is applied to the plurality of electrodes, the flexible film layer including a low rigidity portion in a circumferential direction thereof, and a relative size of the low rigidity portion varying in the circumferential direction of the flexible film layer.

3. A variable-shape mirror comprising a flexible film layer, the mirror having a plurality of electrodes in a layer on at least one surface thereof and a reflective surface whose shape varies when an electrostatic force is applied to the plurality of electrodes, the flexible film layer including openings in a circumferential direction thereof, and a ratio of an opening area to a unit area varying in the circumferential direction of the flexible film layer.

4. A variable-shape mirror according to claim 3, wherein a diameter of each of the openings is shorter than a wavelength of light reflected by the reflective surface.

5. A variable-shape mirror comprising:

a fixed lower electrode; and a flexible film having a reflective surface and a plurality of upper electrodes, the lower electrode has, in a region thereof, a plurality of openings arranged at different intervals, and the flexible film has, in a peripheral portion thereof, a portion having a rigidity lower than a rigidity of other regions of the flexible film.

6. A variable-shape mirror according to claim 5, wherein the portion with the lower rigidity comprises a plurality of openings provided in the flexible film.

* * * * *